United States Patent
Lee

(10) Patent No.: US 12,291,261 B2
(45) Date of Patent: May 6, 2025

(54) BEARING AND STEERING APPARATUS HAVING THE SAME

(71) Applicant: HL MANDO CORPORATION, Gyeonggi-do (KR)

(72) Inventor: Kyeongho Lee, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 0 days.

(21) Appl. No.: 18/238,392

(22) Filed: Aug. 25, 2023

(65) Prior Publication Data
US 2024/0101181 A1   Mar. 28, 2024

(30) Foreign Application Priority Data
Sep. 26, 2022   (KR) .......................... 10-2022-0121519

(51) Int. Cl.
*B62D 1/16*   (2006.01)
*B62D 5/00*   (2006.01)

(52) U.S. Cl.
CPC .............. *B62D 1/16* (2013.01); *B62D 5/006* (2013.01)

(58) Field of Classification Search
CPC . B62D 1/16; B62D 5/006; F16C 33/58; F16C 2326/24; F16C 35/063; B60Y 2410/102
See application file for complete search history.

(56) References Cited

U.S. PATENT DOCUMENTS

| | | | | |
|---|---|---|---|---|
| 3,866,989 A | * | 2/1975 | Potter | F16C 35/063 384/537 |
| 4,185,880 A | * | 1/1980 | Shiomi | F16C 23/084 74/492 |
| 5,193,917 A | * | 3/1993 | Adler | F16C 27/066 384/539 |
| 5,749,786 A | * | 5/1998 | Pattok | B62D 1/16 464/106 |
| 5,975,766 A | * | 11/1999 | Cau | F16C 25/083 384/538 |

(Continued)

FOREIGN PATENT DOCUMENTS

| | | |
|---|---|---|
| DE | 10 2020 215 345 | 6/2022 |
| JP | 2006-312965 | 11/2006 |

(Continued)

OTHER PUBLICATIONS

Office Action dated May 13, 2024 for Korean Patent Application No. 10-2022-0121519 and its English translation provided by Applicant's foreign counsel.

(Continued)

*Primary Examiner* — Frank B Vanaman
(74) *Attorney, Agent, or Firm* — WOMBLE BOND DICKINSON (US) LLP

(57) ABSTRACT

A bearing is disposed between a steering shaft and an inner column covering at least a part of the steering shaft. The bearing includes: an inner ring supporting an outer circumference of the steering shaft and having an elastically deformable material such as a plastic-containing material; an outer ring of which at least a part faces an inner circumference of the inner column; and a roller rotatably disposed between the inner ring and the outer ring. The bearing may be included in a steering apparatus.

13 Claims, 5 Drawing Sheets

(56) References Cited

U.S. PATENT DOCUMENTS

| | | | | |
|---|---|---|---|---|
| 6,227,715 B1* | 5/2001 | Erhardt | ................ | F16C 25/083 |
| | | | | 384/537 |
| 9,341,216 B2* | 5/2016 | Bussit | ................... | F16C 35/073 |
| 9,850,958 B2* | 12/2017 | Giroud | ................... | F16C 35/073 |
| 2001/0052893 A1* | 12/2001 | Jolly | ..................... | G06F 3/0338 |
| | | | | 345/156 |
| 2016/0032975 A1 | 2/2016 | Dupuis et al. | | |
| 2021/0163061 A1* | 6/2021 | Schemmel | ............. | B60K 35/00 |

FOREIGN PATENT DOCUMENTS

| | | |
|---|---|---|
| KR | 20-0129050 | 5/1999 |
| KR | 10-2004-0087791 | 10/2004 |
| KR | 10-2106012 | 4/2020 |

OTHER PUBLICATIONS

Office Action dated Jun. 5, 2024 for German Patent Application No. 10 2023 208 488.0 and its English translation provided by Applicant's foreign counsel.

\* cited by examiner

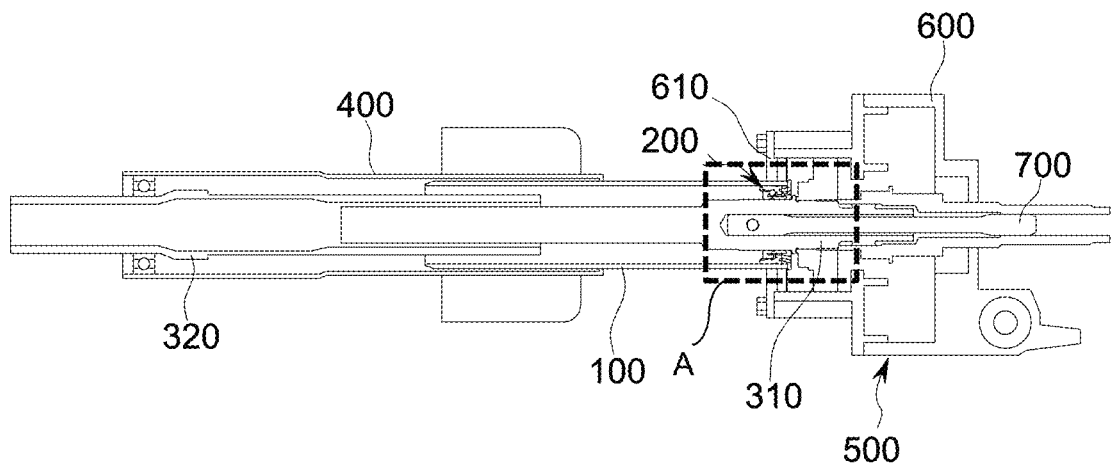
[FIG.1]

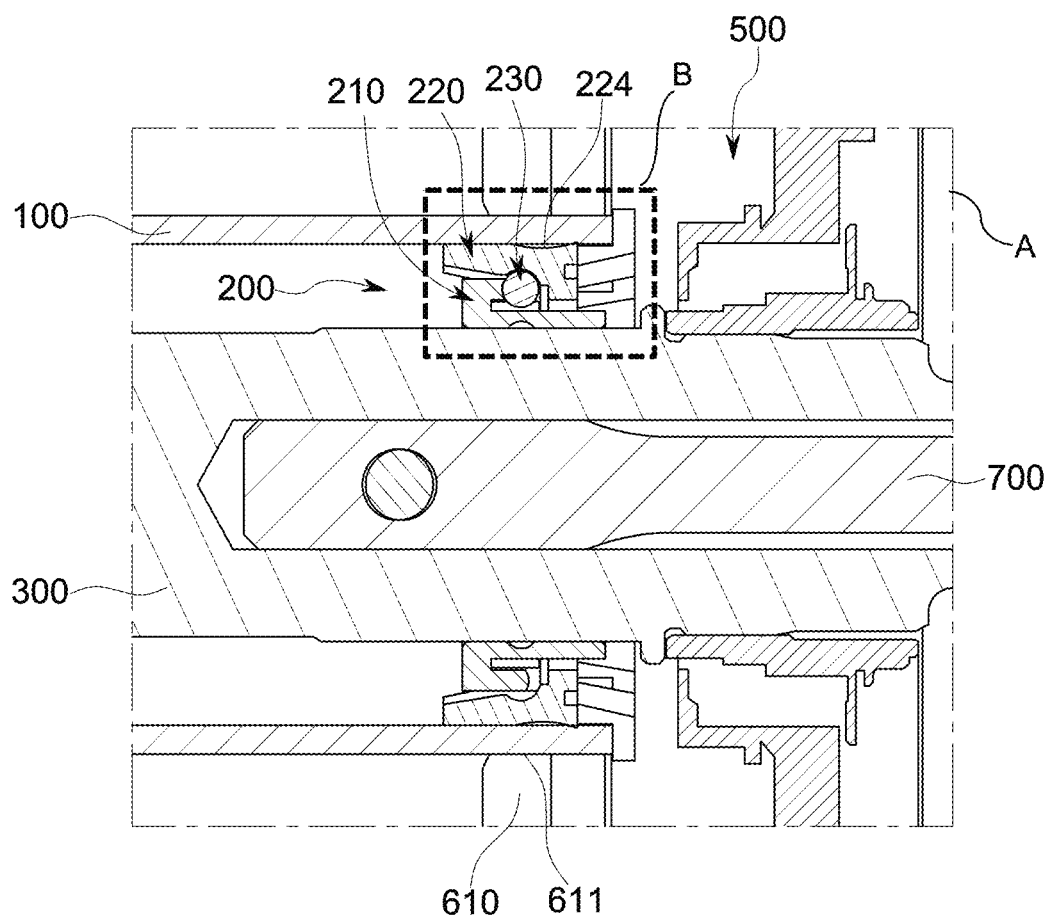
[FIG.2]

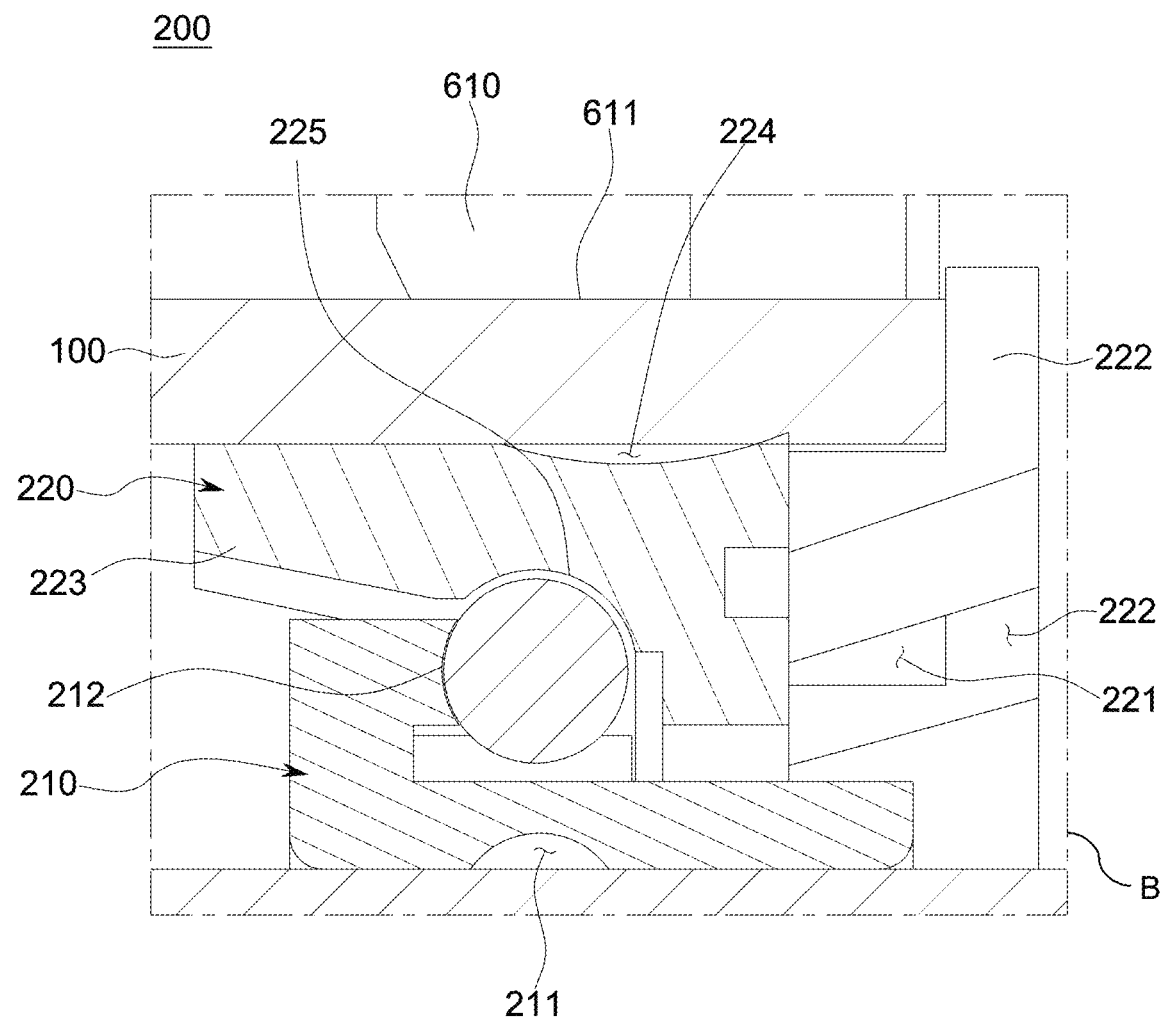
[FIG.3]

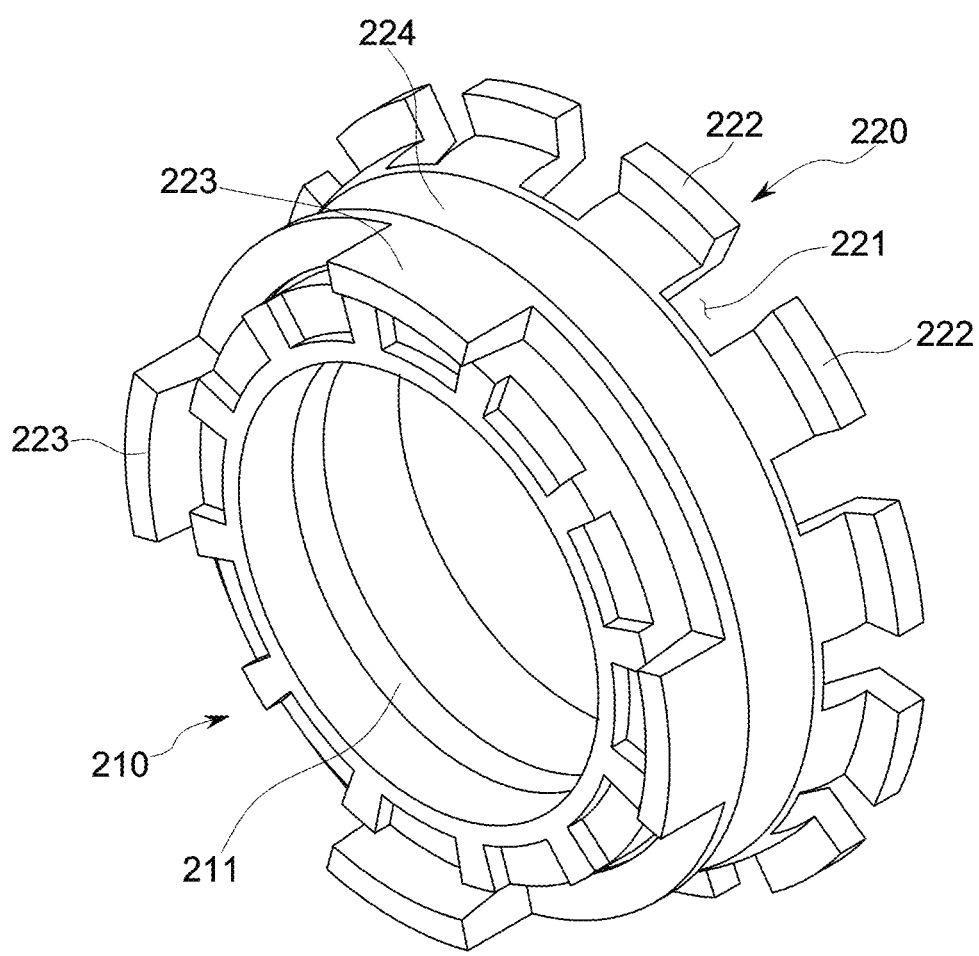
[FIG.4]

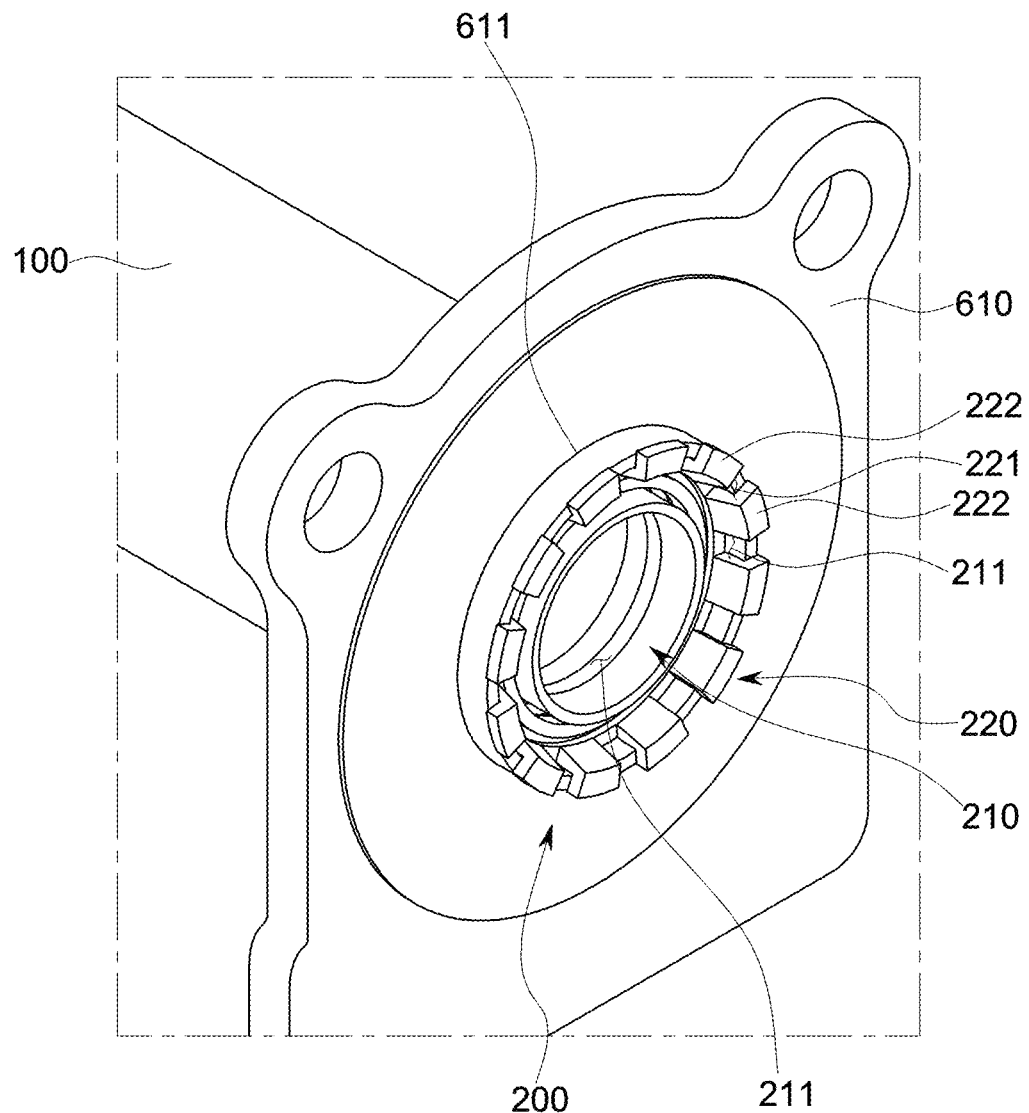
[FIG.5]

BEARING AND STEERING APPARATUS HAVING THE SAME

CROSS-REFERENCE TO RELATED APPLICATIONS

This application claims benefit and priority to Korean Patent Application No. 10-2022-0121519, filed on Sep. 26, 2022, with the Korean Intellectual Property Office, the disclosure of which is incorporated herein in its entirety by reference.

TECHNICAL FIELD

Embodiments of the present disclosure generally relate to a bearing and a steering apparatus including the same, and more particularly, to a bearing which can simplify machining processes and reduce the number of parts, and the weight of a steering apparatus, and the steering apparatus including the same.

BACKGROUND

A bearing is generally made of metal, and in order to install the bearing in a column, a process of expanding the diameter of a portion of the column and inserting the bearing into the column is required.

Moreover, it is necessary to install O-rings between the bearing and a shaft to fix the installation position of the bearing and to ensure smooth coupling with the shaft, and a process of machining grooves to allow these O-rings to be installed on the outer circumferential surface of the shaft is also required.

As described above, the process of assembling the parts for the steering apparatus may require complicated steps and parts for installing and assembling the bearing to a steering apparatus.

SUMMARY

Some embodiments of the present disclosure may provide a bearing, which can simplify machining processes and reduce the number of parts, and a steering apparatus including the same.

According to an embodiment of the present disclosure, a bearing, which is arranged to support the rotation between a steering shaft and an inner column arranged to surround at least one area of the steering shaft, comprises: an inner ring that supports an outer circumference of the steering shaft and is formed of a plastic-containing material; an outer ring of which at least a part faces an inner circumference of the inner column; and a roller that is disposed between the inner ring and the outer ring.

One area on one side of the outer ring may be bent in a direction away from the inner ring and supported on one end of the inner column.

The outer ring may comprise a plurality of stoppers that are formed spaced apart from each other in one area on one side of the outer ring.

The outer ring may further comprise a plurality of cutouts that are formed between the plurality of stoppers.

The inner ring may comprise a lubrication groove that is formed to be recessed in one area of the inner circumferential surface of the inner ring to store grease.

One area on the other side of the outer ring may comprise extension protrusions that protrude beyond the inner ring along the longitudinal direction of the inner column.

The outer ring may comprise an outer ring support groove that is formed to accommodate a part of the roller.

The inner ring may comprise an inner ring support groove that is formed to accommodate another part of the roller.

A steering apparatus according to an embodiment of the present disclosure may comprise: a steering shaft; an inner column that accommodates at least a part of the steering shaft therein; and a bearing of which at least a part is disposed between the steering shaft and the inner column and that includes an elastically deformable material.

The inner column may be formed parallel to the longitudinal direction of the steering shaft.

The bearing may comprise: an inner ring that is arranged to face the steering shaft; an outer ring that is arranged to face an inner circumferential surface of the inner column; and a roller that is disposed between the inner ring and the outer ring.

A lubrication groove may be formed to be recessed on an inner circumferential surface of the inner ring to store grease.

A plurality of cutouts may be formed in one area of the outer ring in a direction parallel to the central axis of the outer ring, and the plurality of cutouts may be spaced apart from each other along a circumferential direction of the outer ring.

A partial area between the plurality of cutouts may be bent toward the outer circumferential direction of the outer ring and supported on the side of one end of the inner column.

The remaining area between the plurality of cutouts may be arranged to face the inner circumferential surface of the inner column.

The outer ring supported on the side of one end of the inner column may protrude in the outer circumferential direction of the inner column.

In another area of the outer ring facing the inner circumference of the inner column, a buffer section may be formed to have a smaller outer diameter than the remaining area between the plurality of cutouts.

The above-described steering apparatus may further comprise an outer column into which at least a part of the inner column is inserted; a feedback actuator that assists and provides steering force transmitted to the steering shaft; a housing in which the feedback actuator is disposed; and a flange that is disposed outside one side of the inner column and coupled to the housing to create an installation area of the feedback actuator.

A bent area of the outer ring that supports the side of one end of the inner column may extend toward the flange.

At least one of the inner ring, the outer ring, and the roller may be formed of a plastic-containing material.

Advantageous Effects

According to certain embodiments of the present disclosure, a bearing and a steering apparatus including the same can simplify processes for installing and assembling the bearing and reduce the number of parts of the bearing.

According to some embodiments of the present disclosure, one or more components of a bearing may be formed of an elastically deformable material such as a plastic material, thereby effectively reducing the weight of the bearing and the steering apparatus including the same.

BRIEF DESCRIPTION OF THE DRAWINGS

FIG. 1 is a cross-sectional view of a steering apparatus according to an embodiment of the present disclosure.

FIG. 2 is an enlarged view of a portion A of FIG. 1.

FIG. 3 is an enlarged view of a portion B of FIG. 2.

FIG. 4 is a perspective view of showing a bearing according to an embodiment of the present disclosure.

FIG. 5 is a partial perspective view for showing a bearing assembled with a steering apparatus according to an embodiment of the present disclosure.

DETAILED DESCRIPTION

Hereinafter, embodiments of the present disclosure will be described in detail with reference to the accompanying drawings so that those skilled in the art can easily carry out the present disclosure. The embodiments of the present disclosure may be embodied in many different forms and are not limited to those set forth herein.

It should be noted that the drawings are schematic and are not drawn to scale. Relative dimensions and proportions of parts of the drawings have been shown exaggerated or reduced in size, for the sake of clarity and convenience in the drawings, and these dimensions are illustrative and are not intended to be limiting. Further, the same structures, elements, or parts which are illustrated in at least two drawings are denoted by the same reference numerals, which are used to indicate similar features.

The embodiments of the present disclosure specifically represent ideal embodiments of the present disclosure. As a result, various variations of the illustrations are expected. Accordingly, the embodiments are not limited to specific shapes of shown regions, and for example, include modifications of the shape by manufacturing.

A bearing 200 according to an embodiment of the present disclosure will be described with reference to FIGS. 1 to 4.

As shown in FIG. 1, the bearing 200 according to an embodiment of the present disclosure may be installed in a steering apparatus 101 including a steering shaft 300 and an inner column 100. However, the bearing 200 is not limited to be located at any particular position. The bearing 200 may support the rotation between the steering shaft 300 and the inner column 100.

As shown in FIGS. 2 to 4, the bearing 200 may include an inner ring 210, an outer ring 220, and a roller 230.

The inner ring 210 may support an outer circumference of the steering shaft 300. Specifically, the inner ring 210 may have a hollow space or center to accommodate or support the steering shaft 300 to be inserted therein. The inner circumference of the inner ring 210 may be arranged to face of the outer circumference of the steering shaft 300.

The inner ring 210 may be formed of, for example, but not limited to, a plastic-containing material or any flexible or elastically deformable material. Therefore, the inner ring 210 can be elastically deformed by an external force applied thereto during the assembly of the steering apparatus 101.

At least a part of the outer ring 220 may be arranged to face the inner circumference of the inner column 100. Specifically, at least a part of the outer circumference of the outer ring 220 may be disposed or arranged to face the inner circumference of the inner column 100. Moreover, the outer ring 220 may be positioned or arranged closer to the inner column 100 than the inner ring 210.

The roller 230 may be rollably or rotatably disposed between the inner ring 210 and the outer ring 220 to support the rotation between the roller 230 and the inner ring 210. Specifically, the roller 230 may be formed in a ball-shape or cylindrical shape to support the relative rotational motion between the inner ring 210 and the outer ring 220.

With this configuration, since the inner ring 210 of the bearing 200 according to an embodiment of the present disclosure may include plastic, it is possible to facilitate the coupling between the inner column 100 and the steering shaft 300 of the steering apparatus 101. In other words, the bearing 200 includes an elastically deformable material and thus can easily be coupled to the steering shaft 300 and the inner column 100.

Moreover, one area on one side of the outer ring 220 according to an embodiment of the present disclosure may be bent in a direction away from the inner ring 210.

A part formed on one side of the outer ring 220 may have a shape bent in a direction away the outer circumferential direction of the inner ring 210 (e.g. a projection protruding outwardly).

Further, the part having the bent shape formed on one side of the outer ring 220 may be supported by, or be in contact with, one end of the inner column 100. For instance, the outer ring 220 may include a plurality of stoppers 222 that are spaced apart from each other and bent toward an outer circumferential direction.

That is, the plurality of stoppers 222 may allow the outer ring 220 to be fixedly supported or caught on one end of the inner column 100.

Accordingly, the bearing 200 can effectively and stably support the rotation between the inner column 100 and the steering shaft 300 (e.g. the rotation of the steering shaft 300 with respect to the steering shaft 300) without changing its position.

In addition, with the plurality of stoppers 222 included in the bearing 200, the bearing 200 can be effectively installed in the inner column 100 without expanding or increasing the diameter of the inner column 100 for the installation space of the bearing 200, and its installation position can be supported by the inner column 100.

According to an embodiment of the present disclosure, the outer ring 220 may further include a plurality of cutouts 221. The plurality of cutouts 221 may be formed between the plurality of stoppers 222 of the bearing 200.

The cutouts 221 may be formed on one side of the outer ring 220. The cutouts 221 may be formed such that the outer ring 200 can have an open end and may be formed along one direction of the outer ring 220. For example, the cutouts 221 may be formed in the longitudinal direction (e.g. an axial direction) of the outer ring 220 (in a direction parallel to the longitudinal or axial direction of the inner column 100).

Moreover, the outer ring 220 may have a plurality of cutouts 221 may, and the plurality of cutouts 221 may be spaced apart from each other along the circumferential direction of the outer ring 220. That is, the cutouts 221 may be formed in a direction parallel to, or coaxial with, the central axis of the outer ring 220, and the plurality of cutouts 221 may be spaced apart from each other along the circumferential direction of the outer ring 220. The plurality of cutouts 221 may be radially spaced apart from each other on the outer ring 220.

One part formed on one side of the outer ring 220, in which the plurality of cutouts 221 are formed, is bent and supported on or by one end of the inner column 100. That is, the stoppers 222 may be formed at or on one side of the outer ring 220 in which the cutouts 221 are formed to be spaced apart from each other.

The remaining part (which is not bent) formed at one side of the outer ring 220 having the plurality of cutouts 221 may be arranged to face the inner column 100. Specifically, the remaining part (which is not bent) of one side of the outer ring 220 may be adjacent to the plurality of stoppers 222 and arranged to face the inner circumferential surface of the inner column 100.

Therefore, since the plurality of cutouts 221 are formed between the plurality of stoppers 222 of the bearing 200, it is possible to prevent deformation of the outer ring 220 when the stoppers 222 are bent, and create a space that allows the outer ring 220 to be elastically deformed by means of the plurality of cutouts 221. Accordingly, this space formed by the plurality of cutouts 221 may allow the bearing 200 to be elastically deformed when the bearing 200 is assembled with other components of the steering apparatus 101, thereby facilitating the assembly of the steering apparatus 101. That is, the plurality of cutouts 221 can provide a space that allows the plurality of stoppers 222 to be deformable in the circumferential direction.

Moreover, the inner ring 210 according to an embodiment of the present disclosure may include a groove 211 for lubrication as shown in FIGS. 2 to 4.

The groove 211 for lubrication may be formed to be recessed in a partial area of the inner circumferential surface of the inner ring 210 to store a lubricant such as grease between the steering shaft 300 and the inner ring 210.

The lubrication groove 211 may be formed on a portion of the inner circumferential surface of the inner ring 210 so that the other portion of the inner circumferential surface of the inner ring 210 can maintain the contact with the steering shaft 300 and effectively support the rotation of the steering shaft 300. Specifically, the lubrication groove 211 may be formed to be recessed along the circumferential direction of the inner ring 210.

According to an embodiment of the present disclosure, instead of a component such as an O-ring, which is provided to maintain the contact force between the bearing and the steering shaft, the lubrication groove 211 capable of storing grease in the inner ring 210 of the bearing 200 can effectively maintain the rotation transfer between the inner ring 210 and the steering shaft 300 and effectively prevent damage due to breakage of the bearing 200.

Moreover, an embodiment of the present disclosure can remove the necessity of machining an installation groove on the surface of the steering shaft for the installation of the above-mentioned O-ring by the use of the bearing 200.

The outer ring 220 according to an embodiment of the present disclosure may include extension protrusions 223.

The extension protrusions 223 may protrude beyond the inner ring 210 in the other side of the outer ring 220 disposed between the inner column 100 and the steering shaft 300. Specifically, the extension protrusions 223 of the outer ring 220 may extend or protrude further than an end of the inner ring 210 in an axial direction at the other side of the outer ring 220 which is opposite to one side of the outer ring 220 where the cutouts 221 and the stoppers 222 are formed.

The extension protrusions 223 may extend from the other side of the outer ring 220. Specifically, the extension protrusions 223 may protrude and extend from the other side of the outer ring 220 and may be spaced apart from each other along the circumferential direction of the outer ring 220.

Specifically, as shown in FIGS. 2 to 4, the extension protrusions 223 may outwardly extend and protrude in the outer circumferential direction of the outer ring 220 so that a part of the other side of the outer ring 220 is inclined.

Accordingly, the outer circumferential surface of the extension protrusions 223 may press and support the inner circumferential surface of the inner column 100. That is, the extension protrusions 223 can effectively maintain the contact between the inner column 100 and the bearing 200.

The plurality of extension protrusions 223 spaced apart from each other can be deformed and assembled when the outer ring 220 is assembled with the inner column 100, and can effectively maintain the contact with the inner circumferential surface of the inner column 100.

The outer ring 220 according to an embodiment of the present disclosure may include an outer ring support groove 225.

The outer ring support groove 225 may be formed concavely to accommodate a part of the roller 230. Specifically, the outer ring support groove 225 may be formed concavely on the inner circumferential surface of the outer ring 220 to accommodate a part of the roller 230 and allow the roller 230 to rotate therein. That is, the outer ring support groove 225 may create a movement space for the roller 230 so that the roller 230 can be rotatable in the outer ring support groove 225.

The inner ring 210 according to an embodiment of the present disclosure may include an inner ring support groove 212.

The inner ring support groove 212 may be formed to accommodate another part of the roller 230. Moreover, the inner ring support groove 212 may create a movement space for the roller 230 so that the roller 230 can be rotatable in the inner ring support groove 212.

The outer ring support groove 225 and the inner ring support groove 212 may be formed to prevent the roller 230 from being separated from the inner ring 210 and the outer ring 220.

The outer ring 220 of the bearing 200 according to an embodiment of the present disclosure may include a buffer part 224 as shown in FIGS. 3 and 4.

The buffer part 224 may be formed on the outer ring 220 where the cutouts 221 are not formed. Moreover, the buffer part 224 may be formed between one side and the other side of the outer ring 220 to have a smaller outer diameter than the remaining part in which the cutouts 221 of the outer ring 220 are formed and which is arranged to face the inner circumference of the inner column 100.

The buffer part 224 may be formed on the outer circumferential surface of the outer ring 220 to be spaced apart from the cutouts 221. Moreover, the buffer part 224 may have a smaller outer diameter than the inner diameter of the inner column 100 to facilitate the assembly of the inner side of the inner column 100 and the front surface of the outer ring 220 when they come into contact with each other.

Specifically, the buffer part 224 may be formed to be recessed in an part of the outer ring 220 where the cutouts 221 are not formed. The buffer part 224 may be spaced apart from the inner circumferential surface of the inner column 100 and can provide a space that allows the other part of the outer ring 220 to press the inner circumferential surface of the inner column 100 or allows the bearing 200 to be deformable when the bearing 200 is inserted into the inner column 100. That is, the buffer part 224 may provide a space that allows the bearing 200 to be elastically deformed.

For example, as shown in FIG. 3, the central part of the outer ring 220 in which the buffer part 224 is formed may be formed to have a thickness greater than one side of the outer ring 220 in which the stoppers 222 are formed or the other side of the outer ring in which the extension protrusions 223 are formed.

The center of the buffer part 224 according to an embodiment of the present disclosure may be arranged to closer to one end of the inner column 100 than the center of the lubrication groove 211.

The center of the buffer part 224, which has the smallest outer diameter on the outer surface of the outer ring 220, may be arranged closer to one end of the inner column 100 than the center of the lubrication groove 211, which has the largest inner diameter on the inner surface of the inner ring 210.

The roller 230 according to an embodiment of the present disclosure may be disposed between one area that is closer to one end of the inner column 100 within the buffer section 224 and one area that is farer from one end the inner column 100 within the lubrication groove 211.

As shown in FIG. 3, the roller 230 may be disposed between one area that is closer to one end of the inner column 100 within the buffer section 224 formed on the outer ring 220 and one area that is farther from one end of the inner column 100 within the lubrication groove 211.

Therefore, the roller 230 allows the inner ring 210 to effectively maintain the contact with the steering shaft 300 and allows the outer ring 220 to be effectively supported on the inner column 100 to effectively support the relative rotation between the inner ring 210 and the outer ring 220.

At least one of the inner ring 210, the outer ring 220, and the roller 230 of the bearing 200 according to an embodiment of the present disclosure may be formed of, for instance, but not limited to, a plastic-containing material.

The bearing 200 made of plastic can reduce the weight compared to a metallic bearing and effectively reduce the complexity of a process associated with the installation of the bearing 200 compared to a process of the assembly of a metallic bearing.

For example, one or more of the inner ring 210, the outer ring 220, and the roller 230 of the bearing 200 may be formed of a plastic-containing material, thereby reducing the weight of the bearing 200.

With this configuration, the bearing 200 with a reduced weight according to an embodiment of the present disclosure can be installed in the steering apparatus 101.

Moreover, the bearing 200 according to an embodiment of the present disclosure may not require a process of expanding or increasing the diameter of the inner column for the installation of the bearing.

Further, since the bearing 200 according to an embodiment of the present disclosure is supported on one end of the inner column 100, when the inner column 100 moves in the longitudinal or axial direction, it is possible to prevent the bearing 200 from being displaced from the installation position and facilitate the assembly of the bearing 200 into the inner column 100.

Next, a steering apparatus 101 according to an embodiment of the present disclosure will be described with reference to FIGS. 1 to 5.

As shown in FIG. 1, a steering apparatus 101 according to an embodiment of the present disclosure may include a steering shaft 300, an inner column 100, and a bearing 200.

The steering shaft 300 may transmit steering force so that the direction of a vehicle's wheels can controlled based on steering information, input or manipulation provided by a driver operating a steering wheel.

At least a part of the steering shaft 300 may be inserted into the inner column 100.

At least a part of the bearing 200 may be disposed between the steering shaft 300 and the inner column 100. Moreover, the bearing 200 may include an elastically deformable material. Specifically, the bearing 200 may have an elastic force that can be restored after being deformed in response to a certain range of external force.

In the steering apparatus 101 according to an embodiment of the present disclosure, since the bearing 200 includes an elastically deformable material, it is possible to facilitate the assembly of the bearing 200 with the steering apparatus 101.

The bearing 200 of the steering apparatus 101 according to an embodiment of the present disclosure may have the same configuration as the bearing 200 of the above-described embodiment of the present disclosure.

Moreover, the inner column 100 of the steering apparatus 101 according to an embodiment of the present disclosure may be disposed parallel to the longitudinal direction of the steering shaft 300 or coaxial with the steering shaft 300.

The inner column 100 may have a constant inner diameter and may be disposed parallel to the longitudinal direction of the steering shaft 300 or coaxial with the steering shaft 300. Specifically, the bearing 200 of the steering apparatus 101 according to an embodiment of the present disclosure can be elastically deformed and thus may not require a diameter-expended portion for the installation of the bearing in the inner column or a process of creating an installation area thereof.

The steering apparatus 101 according to an embodiment of the present disclosure may include an outer column 400, a feedback actuator 500, a housing 600, and a flange 610.

The outer column 400 may slidably movably support the inner column 100. Moreover, at least a part of the inner columns 100 may be inserted into the outer column 400. That is, the inner column 100 may be moved from the outer column 400 in an extension or contraction direction.

The feedback actuator 500 may provide power or assistant torque to assist the steering force transmitted to the steering shaft 300. Specifically, the feedback actuator 500 may assist and provide the steering force according to the current vehicle speed or steering angle information provided or input by the driver so that the vehicle can be steered.

The feedback actuator 500 may be disposed in the housing 600. For example, the housing 600 may support a motor included in the feedback actuator 500 and may be installed for power transfer between the motor of the feedback actuator 500 and the steering shaft 300.

The flange 610 may be coupled to the housing 600 and may provide an installation area or space of the feedback actuator 500. The flange 610 may be disposed outside one side of the inner column 100. Specifically, the flange 610 may provide an installation space for gears inside the housing 600 and may be assembled after the installation of the gears is completed.

Moreover, a flange hole 611 may be formed in the flange 610, through which the inner column 100 and the steering shaft 300 protruding from the inside of the inner column 100 can pass. One end of the inner column 100 may be inserted in and supported on the flange hole 611 of the flange 610.

For example, one end of the inner column 100 may be arranged or positioned adjacent to the feedback actuator 500, and the other end of the inner column 100 may be arranged or disposed inside the outer column 400.

Furthermore, as shown in FIGS. 3 and 5, a bent part of the outer ring 220 according to an embodiment of the present disclosure may extend toward the flange 610.

The stoppers 222 formed by the bent part of the outer ring 220 may support one end of the inner column 100 and one end of the stoppers 222 may extend toward the flange 610. Specifically, one end of each of the stoppers 222 may pass through the flange hole 611 of the flange 610 to be arranged inside the flange 610. The outer diameter of the other side of the outer ring 220 connecting one end of each of the plurality of bent stoppers 222 may be greater than the inner diameter of the flange hole 611 of the flange 610.

Thus, one end of each of the stoppers 222 can be effectively and stably supported not only on the side of one end of the inner column 100, but also on the flange 610.

The steering shaft 300 according to an embodiment of the present disclosure may include an inner shaft 310 and an outer shaft 320.

One side of the inner shaft 310 may be directly or indirectly coupled to the steering wheel. Moreover, the inner shaft 310 may receive steering force provided by the feedback actuator 500. Specifically, one side of the inner shaft 310 may be arranged to pass through the housing 600.

At least a part of the inner shaft 310 may be arranged to be inserted in the outer shaft 320. The outer shaft 320 may support the inner shaft 310 to be expandable or contractible and may be formed to receive rotational force of the inner shaft 310.

The steering apparatus 101 according to an embodiment of the present disclosure may include a torsion bar 700.

The torsion bar 700 may be installed inside the inner shaft 310 to detect the rotational force of the inner shaft 310.

Specifically, the steering shaft 300 supported by the bearing 200 according to an embodiment of the present disclosure may be in one area outside the inner shaft 310 in which the torsion bar 700 is installed.

With this configuration, in the steering apparatus 101 according to an embodiment of the present disclosure, since the bearing 200 is formed of a plastic-containing material and can be elastically deformed, it is possible to efficiently install the bearing 200 inside the inner column 100.

The bearing 200 formed of a plastic-containing material can reduce the weight of the steering apparatus 101 compared to a metallic bearing.

Moreover, the steering apparatus 101 according to an embodiment of the present disclosure can easily be assembled with the inner column 100 and the steering shaft 300, which can eliminate a process of expanding or increasing the diameter of the inner column for the installation of the bearing and reduce the number of the parts, such as O-ring, etc., for the installation thereof.

Although the embodiments of the present disclosure have been described with reference to the accompanying drawings, those skilled in the art to which the present disclosure pertains can understand that the present disclosure can be implemented in other specific forms without changing the technical spirit or essential features thereof.

Therefore, the embodiments described above should be understood as illustrative in all aspects, instead of limiting. The scope of the present disclosure is defined not by the detailed description, but by the appended claims and their equivalents, and the meaning and scope of the claims and all changes or modifications derived from their equivalents should be construed as being included in the scope of the present disclosure.

DETAILED DESCRIPTION OF MAIN ELEMENTS

100: inner column
101: steering apparatus
200: bearing
210: inner ring
211: lubrication groove
212: inner ring support groove
220: outer ring
221: cutouts
222: stoppers
223: extension protrusions
224: buffer section
225: outer ring support groove
230: roller
300: steering shaft
400: outer column
500: feedback actuator
600: housing
610: flange

What is claimed is:

1. A bearing comprising:
   an inner ring supporting an outer surface of a steering shaft and having a plastic-containing material, wherein the bearing is disposed between the steering shaft and an inner column;
   an outer ring, wherein at least a part of an outside surface of the outer ring of the bearing faces an inner surface of the inner column and the inner column covers at least a part of the steering shaft; and
   a roller rotatably disposed between the inner ring and the outer ring,
   wherein a part at one side of the outer ring of the bearing supported on one end of the inner column has a shape bent away from the inner ring of the bearing,
   wherein the outer ring of the bearing comprises:
   a plurality of stoppers spaced apart from each other at the one side of the outer ring of the bearing, wherein the plurality of stoppers bent toward an outer circumferential direction to be supported one end of the inner column; and
   a plurality of cutouts formed between the plurality of stoppers.

2. The bearing of claim 1, wherein the inner ring of the bearing comprises a groove recessed from the inner surface of the inner ring to provide a space for lubricant.

3. The bearing of claim 1, wherein a part at another side of the outer ring of the bearing comprises protrusions protruding further than the inner ring in an axial direction of the inner column.

4. The bearing of claim 1, wherein the outer ring of the bearing comprises an outer ring support groove formed to accommodate a part of the roller.

5. The bearing of claim 4, wherein the inner ring of the bearing comprises an inner ring support groove formed to accommodate another part of the roller.

6. A steering apparatus comprising:
   a steering shaft;
   an inner column accommodating at least a part of the steering shaft in the inner column;
   a bearing comprising an elastically deformable material, wherein at least a part of the bearing is disposed between the steering shaft and the inner column,
   an outer column in which at least a part of the inner column is inserted;
   a feedback actuator configured to generate a force to be transmitted to the steering shaft;
   a housing accommodating the feedback actuator; and
   a flange disposed outside the inner column and coupled to the housing to form a space for accommodating the feedback actuator,
   wherein the bearing comprises:
   an inner ring facing an outer surface of the steering shaft;
   an outer ring facing an inner surface of the inner column, wherein the outer ring of the bearing has a plurality of cutouts formed in a direction parallel to a central axis of the outer ring of the bearing; and a roller rotatably disposed between the inner ring and the outer ring,
wherein a part of the outer ring between the plurality of cutouts is bent outwardly and supported on one end of the inner column,
wherein the bent part of the outer ring of the bearing supporting the one end of the inner column extends toward the flange.

7. The steering apparatus of claim 6, wherein the inner column is disposed parallel to an axial direction of the steering shaft.

8. The steering apparatus of claim 6, wherein a groove is formed to be recessed from an inner surface of the inner ring of the bearing to provide a space for lubricant.

9. The steering apparatus of claim 8, wherein at least one of the inner ring, the outer ring, and the roller of the bearing has a plastic-containing material.

10. The steering apparatus of claim 6, wherein the plurality of cutouts are spaced apart from each other along a circumferential direction of the outer ring of the bearing.

11. The steering apparatus of claim 10, wherein a remaining part of the outer ring between the plurality of cutouts is formed to face the inner surface of the inner column.

12. The steering apparatus of claim 10, wherein the part of the outer ring supported on the one end of the inner column protrudes outwardly.

13. The steering apparatus of claim 11, wherein the remaining part of the outer ring facing the inner surface of the inner column includes a buffer part having an outer diameter smaller than another part of the remaining part of the outer ring between the plurality of cutouts.

* * * * *